US008428766B2

(12) United States Patent
Kwon

(10) Patent No.: US 8,428,766 B2
(45) Date of Patent: Apr. 23, 2013

(54) METHOD OF MANUFACTURING STANDARD EAR SHELLS FOR IN-THE-EAR TYPE GENERAL-PURPOSE HEARING AIDS

(75) Inventor: You Jung Kwon, Seoul (KR)

(73) Assignee: Algor Korea Co., Ltd., Gwangju (KR)

( * ) Notice: Subject to any disclaimer, the term of this patent is extended or adjusted under 35 U.S.C. 154(b) by 236 days.

(21) Appl. No.: 13/121,834

(22) PCT Filed: Sep. 30, 2009

(86) PCT No.: PCT/KR2009/005590

§ 371 (c)(1),
(2), (4) Date: Mar. 30, 2011

(87) PCT Pub. No.: WO2010/038975

PCT Pub. Date: Apr. 8, 2010

(65) Prior Publication Data

US 2011/0180947 A1 Jul. 28, 2011

(30) Foreign Application Priority Data

Oct. 1, 2008 (KR) ........................ 10-2008-0096459

(51) Int. Cl.
*G06F 19/00* (2006.01)
*H04R 25/00* (2006.01)

(52) U.S. Cl.
USPC .............. 700/182; 700/98; 700/117; 381/328

(58) Field of Classification Search .................... 700/95, 700/97, 98, 117, 118, 182; 381/322, 324, 381/328; 703/1, 2; 264/40.1, 401
See application file for complete search history.

(56) References Cited

U.S. PATENT DOCUMENTS 5,333,622 A * 8/1994 Casali et al. .................. 128/864
5,662,605 A 9/1997 Hurwitz
6,210,358 B1 4/2001 Roger
6,731,997 B2 * 5/2004 Hessel et al. ..................... 700/98
7,084,870 B2 * 8/2006 Fang et al. ..................... 345/420
7,206,067 B2 * 4/2007 Jensen et al. ............... 356/241.1
7,251,025 B2 * 7/2007 Jensen et al. ............... 356/241.1
7,286,679 B2 * 10/2007 Fang et al. ..................... 381/322
7,308,328 B2 * 12/2007 Fang et al. ....................... 700/98
7,454,028 B2 * 11/2008 Bachler et al. ................ 381/328
7,467,022 B2 * 12/2008 Bhagwat et al. ................ 700/98
7,571,018 B2 * 8/2009 Roth et al. ....................... 700/98
7,625,335 B2 * 12/2009 Deichmann et al. .......... 600/117
7,801,708 B2 * 9/2010 Unal et al. ........................ 703/2
7,844,065 B2 * 11/2010 von Dombrowski et al. . 381/328
7,875,232 B2 * 1/2011 Parsi et al. .................... 264/401
8,032,337 B2 * 10/2011 Deichmann et al. .............. 703/1
2003/0105450 A1 6/2003 Dimick
2003/0164952 A1 * 9/2003 Deichmann et al. .......... 356/603
2004/0017922 A1 * 1/2004 Bachler et al. ................ 381/322

(Continued)

*Primary Examiner* — Charles Kasenge
(74) *Attorney, Agent, or Firm* — Kile Park Reed & Houtteman PLLC

(57) ABSTRACT

Provided is a method of manufacturing the standard ear shell for use in the ITE type general-purpose hearing aid considering the shape and size of the external auditory meatus according to the embodiment of the present invention, that quantitatively measures shape and size of an external auditory meatus to calculate an average of the measured shape and size of the external auditory meatus, and minimizes an acoustic feedback of the hearing aid or a receiver to save a manufacturing cost, to thereby quickly provide the hearing aid for a patient, mass-produce an average model ear shell, and simultaneously maintain quality of the ear shell consistently.

1 Claim, 4 Drawing Sheets

U.S. PATENT DOCUMENTS

2004/0107080 A1* 6/2004 Deichmann et al. .............. 703/6
2005/0027251 A1 2/2005 Masters
2005/0117765 A1* 6/2005 Meyer et al. .................. 381/328
2005/0247515 A1* 11/2005 Berg ............................. 181/135
2006/0045284 A1* 3/2006 Haussmann et al. ............ 381/72
2006/0171548 A1* 8/2006 Bachler et al. ................ 381/322
2006/0241430 A1* 10/2006 Lin ............................... 600/437
2009/0018465 A1* 1/2009 Hessel et al. .................. 600/559

* cited by examiner

METHOD OF MANUFACTURING STANDARD EAR SHELLS FOR IN-THE-EAR TYPE GENERAL-PURPOSE HEARING AIDS

TECHNICAL FIELD

The present invention relates to a method of manufacturing a standard ear shell for use in an ITE (In-The-Ear) type general-purpose hearing aid. More particularly, the present invention relates to a method of manufacturing a standard ear shell for use in an ITE (In-The-Ear) type general-purpose hearing aid, by quantitatively measuring shape and size of an external auditory meatus to calculate an average of the measured shape and size of the external auditory meatus, and minimizing an acoustic feedback of the hearing aid or a receiver to save a manufacturing cost, to thereby quickly provide the hearing aid for a patient, mass-produce an average model ear shell, and simultaneously maintain quality of the ear shell consistently.

BACKGROUND ART

Among the currently available hearing aids, ITE (In-The-Ear) type or CIC (Completely-In-Canal) type hearing aids which are respectively inserted into an external auditory meatus are manufactured by individual soldering of volume control components such as microphones, amplifiers and receivers with elongate electric wires to then be combined with an ear shell that is individually adaptively manufactured according to the shape and size of an external auditory meatus of a patient.

In addition, an ITE type receiver is manufactured by inserting a receiver or speaker component that generates sound into the inside of the receiver. Ear shell components that are inserted into the entrance of the external auditory meatus have been manufactured into the standard model shape and size.

However, in the case of analog or digital hearing aids, a method of adaptively manufacturing an ear shell according to the shape and size of an external auditory meatus of a patient requires a lot of time and materials in the manufacturing process of manufacturing the ear shell, to thus cause an increase of a manufacturing cost.

In addition, an ear pattern of an external auditory meatus of a patient who wishes to purchase a hearing aid should be necessarily cut out. Thus, the patient should inconveniently visit a hearing aid seller who cut out the ear pattern of his or her external auditory meatus.

Also, the ITE type receiver does not need to cut out an ear pattern of the external auditory meatus of a patient, to make the patient feel comfortable or convenient, but it is not appropriately inserted into the external auditory meatus of the patient, to thereby cause sound to be heard to leak out of the receiver and cause noise for neighboring persons. A receiver cap that is often used in the ITE type receiver is made of a soft rubber membrane to prevent sound from leaking out near entrance of the external auditory meatus, but an acoustic feedback has not been fundamentally blocked.

DISCLOSURE OF THE INVENTION

To solve the above problems, it is an object of the present invention to provide a method of manufacturing a standard ear shell for use in an ITE (In-The-Ear) type general-purpose hearing aid, by quantitatively measuring shape and size of an external auditory meatus to calculate an average of the measured shape and size of the external auditory meatus.

It is another object of this invention to provide a method of manufacturing a standard ear shell for use in an ITE (In-The-Ear) type general-purpose hearing aid, by minimizing an acoustic feedback of the hearing aid or a receiver to save a manufacturing cost.

It is still another object of this invention to provide a method of manufacturing a standard ear shell for use in an ITE (In-The-Ear) type general-purpose hearing aid that enables the hearing aid to be quickly provided for a patient.

It is yet another object of this invention to provide a method of manufacturing a standard ear shell for use in an ITE (In-The-Ear) type general-purpose hearing aid, that enables an average model ear shell to be mass-produced, and quality of the ear shell to be simultaneously maintained consistently.

To accomplish the above objects of the present invention, there is provided a method of manufacturing a standard ear shell for use in an ITE (In-The-Ear) type general-purpose hearing aid, the standard ear shell manufacturing method comprising:

an ear cotton block/thread insert process that pushes an ear cotton block 1 into an external auditory meatus 22 together with an elongate thread 1*a* for use as a withdrawing purpose;

a curing process that injects a silicone resin mixture that is obtained by mixing silicone and a hardener at the ratio of 1 to 1, after having undergone the ear cotton block/thread insert process;

an external auditory meatus ear pattern taking process that pulls the elongate thread 1*a* for use as a withdrawing purpose after having undergone the curing process, to thus take an external auditory meatus ear pattern 5 including the ear cotton block 1 and the ear shell 3 that has been cured in the curing process;

an ear pattern shape/size computerized data collection process that computerizes and collects three-dimensional geometric shape and size of the external auditory meatus ear pattern 5 from the external auditory meatus ear pattern 5 that has been taken in the external auditory meatus ear pattern taking process, using a three-dimensional (3D) scanner;

an external auditory meatus ear pattern volume/circumference/length/angle calculation process that calculates volume, circumference ($C_0$, $C_1$, $C_2$) length ($L_1$, $L_2$), and angle ($\theta_1$, $\theta_2$) of the external auditory meatus 22 from the three-dimensional geometric shape and size computerized data of the external auditory meatus ear pattern 5 that has been collected in the ear pattern shape/size computerized data collection process; and a geometric numerical value induction process that statistically processes data of the volume, circumference ($C_0$, $C_1$, $C_2$) length ($L_1$, $L_2$), and angle ($\theta_1$, $\theta_2$) that have been collected from a number of the ear patterns 5 of a number of the external auditory meatuses 22 that have been calculated in the external auditory meatus ear pattern volume/circumference/length/angle calculation process, to thereby induce equated geometric numerical values.

BRIEF DESCRIPTION OF THE DRAWINGS

The above and other objects and advantages of the present invention will become more apparent by describing the preferred embodiments thereof in detail with reference to the accompanying drawings in which.

BEST MODE FOR CARRYING OUT THE INVENTION

Figure 1:
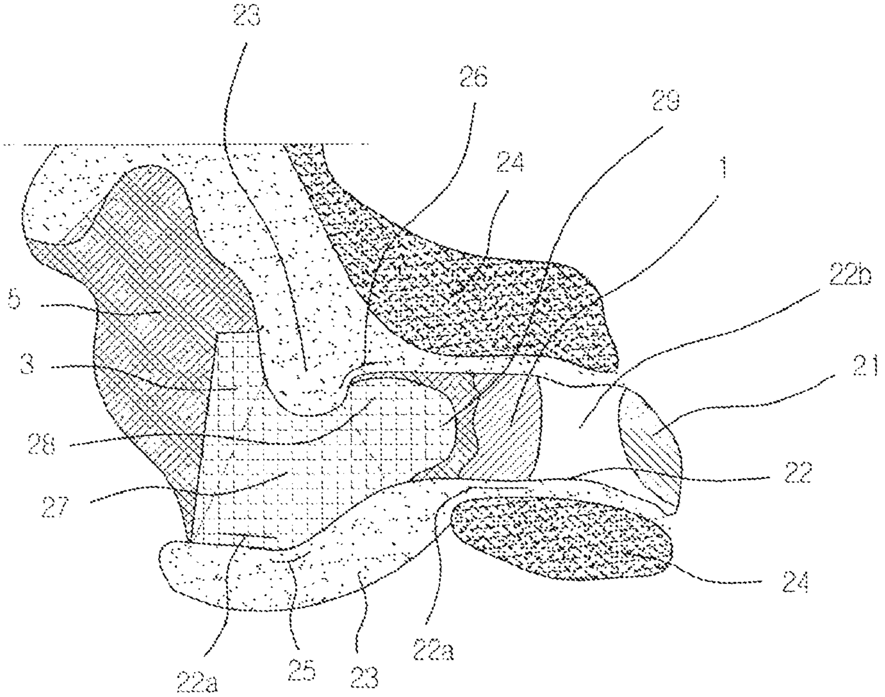
FIG. 1 is a cross-sectional view schematically showing a section of an ear canal in order to explain a method of making an ear pattern of a standard ear shell for use in an ITE (In-The-Ear) type general-purpose hearing aid according to an embodiment of the present invention.
Figure 2:
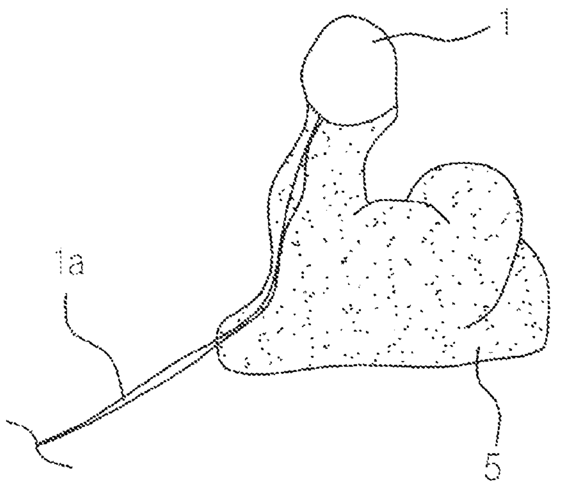
FIG. 2 is a schematic view showing a picture that is obtained by putting an ear pattern including an ear shell and an ear cotton block withdrawn from an ear canal of FIG. 1 into a three-dimensional scanner (model iscan) manufactured by Siemens company and then scanning the ear pattern geometrically in a stereo version with two cameras.

Hereinbelow, a method of manufacturing a standard ear shell for use in an ITE type general-purpose hearing aid according to an embodiment of the present invention according to a preferred embodiment of the present invention will be described with reference to the accompanying drawings.

FIGS. 1 through 7 are provided to describe a method of manufacturing a standard ear shell for use in an ITE (In-The-Ear) type general-purpose hearing aid, according to an embodiment of the present invention. As shown in FIGS. 1 to 7, the standard ear shell manufacturing method includes: an ear cotton block/thread insert process; a curing process; an external auditory meatus ear pattern taking process; an ear pattern shape/size computerized data collection process; an external auditory meatus ear pattern volume/circumference/length/angle calculation process; and a geometric numerical value induction process.

The ear cotton block/thread insert process pushes an ear cotton block 1 into an external auditory meatus 22 together with an elongate thread 1*a* for use as a withdrawing purpose.

The curing process injects a silicone resin mixture that is obtained by mixing silicone and a hardener at the ratio of 1 to 1, after having undergone the ear cotton block/thread insert process.

The external auditory meatus ear pattern taking process pulls the elongate thread 1*a* for use as a withdrawing purpose after having undergone the curing process, to thus take an external auditory meatus ear pattern 5 including the ear cotton block 1 and the ear shell 3 that has been cured in the curing process.

The ear pattern shape/size computerized data collection process computerizes and collects three-dimensional geometric shape and size of the external auditory meatus ear pattern 5 from the external auditory meatus ear pattern 5 that has been taken in the external auditory meatus ear pattern taking process, using a three-dimensional (3D) scanner.

The external auditory meatus ear pattern volume/circumference/length/angle calculation process calculates volume, circumference ($C_0$, $C_1$, $C_2$) length ($L_1$, $L_2$), and angle ($\theta_1$, $\theta_2$) of the external auditory meatus 22 from the three-dimensional geometric shape and size computerized data of the external auditory meatus ear pattern 5 that has been collected in the ear pattern shape/size computerized data collection process.

The geometric numerical value induction process statistically processes data of the volume, circumference ($C_0$, $C_1$, $C_2$) length ($L_1$, $L_2$), and angle ($\theta_1$, $\theta_2$) that have been collected from a number of the ear patterns 5 of a number of the external auditory meatuses 22 that have been calculated in the external auditory meatus ear pattern volume/circumference/length/angle calculation process, to thereby induce equated geometric numerical values.

In FIG. 1, the tympanic membrane 21 exists at the deep position of the external auditory meatus 22 of the human and the outer portion of the tympanic membrane 21 is a non-shielded external auditory meatus 22. An ear cotton block 1 is pushed into the outer side of an external auditory meatus 22 together with an elongate thread 1*a* for use as a withdrawing purpose. Then, a silicone resin mixture that is obtained by mixing silicone and a hardener at the ratio of 1 to 1 is injected into the inside of the external auditory meatus 22 to then be cured and to thus form an external auditory meatus ear pattern 5 including an ear shell 3.

The outer side of the external auditory meatus 22 is surrounded by the cartilage 23, and the outer side of the cartilage 23 is surrounded by the bone 24. In FIG. 1, a reference numeral 25 denotes the first bend of the external auditory meatus 22, a reference numeral 26 denotes the second bend of the external auditory meatus 22, a reference numeral 27 denotes an acoustic sealed area that is indicated by a dotted block in the ear shell 3, a reference numeral 28 denotes a congestion area, a reference numeral 29 denotes a sound exit, and a reference numeral 22*a* denotes an axial line that is parallel with the external auditory meatus 22.

Figure 6:
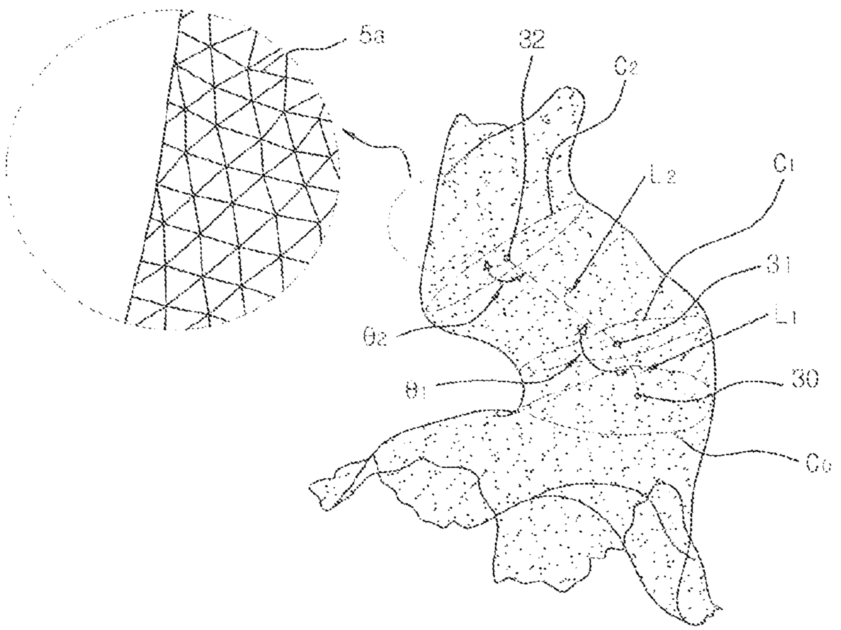
FIG. 6 is a schematic perspective view showing the picture of FIG. 2 at still yet another angle, in which a number of triangular meshes are formed on the surface of the ear shell by the three-dimensional scanner (model iscan) manufactured by Siemens company in order to create vertices of a triangle.

In FIG. 6, a reference numeral 30 denotes the center of the entrance of the external auditory meatus 22, a reference numeral 31 denotes the center of a first bend of the external auditory meatus 22, a reference numeral 32 denotes the center of a second bend of the external auditory meatus 22, a reference alphanumeric notation $C_0$ denotes the circumference of the sound entrance of the external auditory meatus 22, a reference alphanumeric notation $C_1$ denotes the circumference of the first bend of the external auditory meatus 22, a reference alphanumeric notation $C_2$ denotes the circumference of the second bend of the external auditory meatus 22, a reference alphanumeric notation $L_1$ denotes the distance from the center 30 of the entrance of the external auditory meatus 22 to the center of the first bend of the external auditory meatus 22, a reference alphanumeric notation $L_2$ denotes the distance from the center of the first bend of the external auditory meatus 22 to the center of the second bend of the external auditory meatus 22, a reference alphanumeric notation $\theta_1$ is the angle between the $L_1$ and $L_2$, and a reference alphanumeric notation $\theta_2$ is the angle between the $L_2$ and the circumferential plane of the second bend of the external auditory meatus.

In the case of the ear shell 3 for the hearing aid, no gap should exist between the surface of the skin forming the external auditory meatus 22 and the surface of the ear shell 3 in order to avoid an acoustic feedback (howling) from at least the first bend 25 of the external auditory meatus 22 to the second bend 26 of the external auditory meatus 22. The tissue of the cartilage 23 exists in the inside of the skin forming the external auditory meatus 22. Accordingly, when people say, the chin moves and the external auditory meatus 22 moves. The wider the mouth opens, the larger volume of the external auditory meatus 22 becomes.

In addition, the shape and size of the external auditory meatus 22 of a patient differ from the other patients. Accordingly, the ear shell 3 should be manually made adaptively according to the shape and size of the external auditory meatus 22 of each patient. The ear shell 3 should be deeply inserted into the second bend 26 or deeper of the external auditory meatus 22. However, since the tissue of the cartilage 23 is reduced from the second bend 26 of the external auditory meatus 22 and the external auditory meatus 22 is fixed by the temporal bone of the head, the movement of the external auditory meatus 22 depending upon the opening of the mouth is significantly reduced. Accordingly, the ear shell 3 is fabricated so as to be inserted more deeply by only an extent of about 1 to 2 mm from the second bend 26 of the external auditory meatus 22 to the tympanic membrane. Since a sound exit 29 is provided at the most pointed part of the ear shell 3 that is inserted most deeply into the external auditory meatus 22, an amplified sound pressure is output from the hearing aid, and a non-shielded zone 22*b* of the external auditory meatus 22 remains between the sound exit 29 and the tympanic membrane. A faceplate (not shown) is attached to the opposite side of the sound exit 29 of the ear shell 3. The faceplate (not shown) is positioned in a congestion area of the entrance of the external auditory meatus 22. However, since a person who has severe difficulty in hearing requires a high sound amplification, the faceplate (not shown) is more protruded to the outside.

To produce every other ear shell 3 per patient, silicone and a hardener are first mixed at a certain ratio (for example at the weight ratio of 1 to 1) and the mixture is inserted into the external auditory meatus 22, to thereby take an external auditory meatus ear pattern 5. In this process, to prevent the tympanic membrane or eardrum from being damaged by the silicone, an ear cotton block 1 should be first inserted into the external auditory meatus 22 together with an elongate thread 1*a*, prior to inserting the silicon mixture. Since the elongate thread 1*a* is attached to the ear cotton block 1, the elongate thread 1*a* is pulled out from the external auditory meatus 22 after the silicone has been cured. In this case, the ear cotton block 1 is also taken out together with the elongate thread 1*a*. The original form of the external auditory meatus ear pattern 5 is larger than the ear shell 3 that is needed to produce the hearing aid. The external auditory meatus ear pattern 5 includes the outer parts of the external auditory meatus 22 mostly. The original form of the external auditory meatus ear pattern 5 is used as a reference comparison shape in the process of manufacturing ear shells.

As can be seen from FIG. 1, according to an embodiment of the present invention, the uppermost part of a primarily external auditory meatus ear pattern 5 is the ear cotton block and is connected with the elongate thread 1*a*, to thus protect the tympanic membrane or eardrum. As shown in FIG. 1, the shape and size of the external auditory meatus ear pattern 5 of a patient differs from those of the other patients.

The bottom of the original form of the taken external auditory meatus ear pattern 5 is cut with a knife so as to become a flat plane and to then be put on the flat floor. Then, using the three-dimensional scanner (model iscan) manufactured by Siemens Company, a geometric three-dimensional surface shape of the ear pattern 5 of the external auditory meatus 22 is collected as computerized data.

The computerized data that is collected by the three-dimensional scanner (model iscan) manufactured by Siemens company is initially composed of surface point coordinate data of the ear pattern 5 of the external auditory meatus 22. The surface point coordinate data indicates the shape of the ear pattern 5 of the whole external auditory meatus 22. The three-dimensional surface meshes formed of the triangles 5*a* are created from the surface point coordinate data by a three-dimensional surface mesh creation software program.

Figure 5:
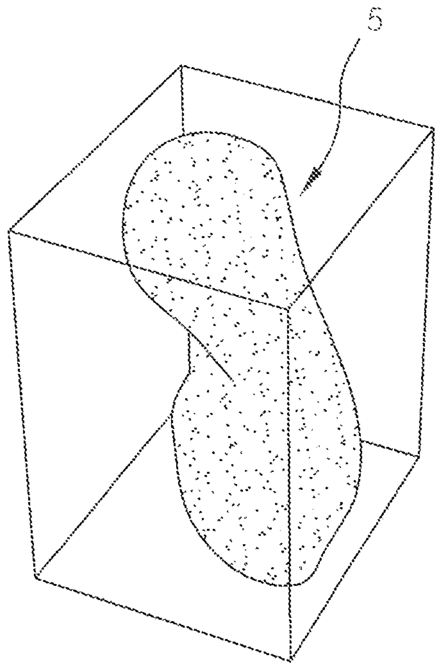
FIG. 5 is a schematic view showing the picture of FIG. 2 at yet another angle, in which a number of triangular meshes are formed on the surface of the ear shell by the three-dimensional scanner (model iscan) manufactured by Siemens company in order to create vertices of a triangle.

As shown in FIG. 5, the three-dimensional surface meshes formed of the triangles 5*a* of FIG. 6 are shown as the shape of the ear pattern 5 of the whole external auditory meatus 22.

Figure 3:
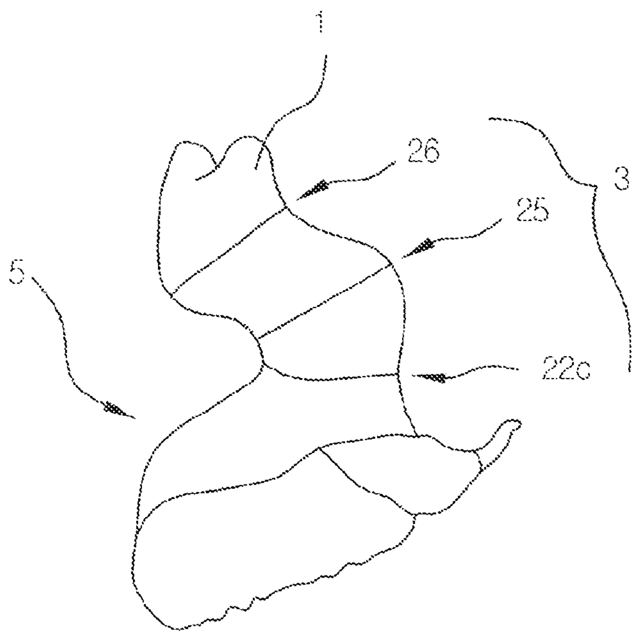
FIG. 3 is a schematic view showing a picture that is obtained by illustrating the picture of FIG. 2 at another angle, in which triangular meshes are formed on the surface of the ear shell by the three-dimensional scanner so as to be easily seen.
Figure 4:
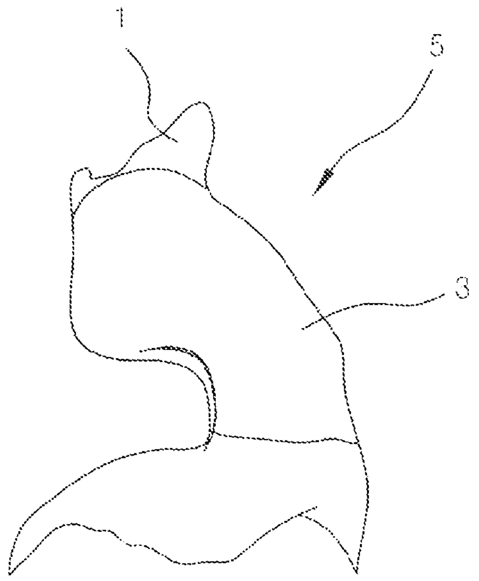
FIG. 4 is a schematic view showing a picture that is obtained by illustrating the picture of FIG. 2 at still another angle, in which triangular meshes are formed on the surface of the ear shell by the three-dimensional scanner so as to be easily seen.

The three-dimensional shape of the external auditory meatus 22 according to an embodiment of the present invention shows the first bend 25 of the external auditory meatus 22, the second bend 26 of the external auditory meatus 22, and the entrance 22*c* of the external auditory meatus 22. As shown in FIGS. 3 and 4, the external auditory meatus ear pattern 5 that has been computerized, collected and visualized by the three-dimensional scanner according to an embodiment of the present invention, shows the parts of the ear shell 3 sectionally. A computational processing on the surface of the external auditory meatus ear pattern 5 or the ear shell 3 is needed in order to analyze and classify the three-dimensional geometric shapes and sizes. For this, the surfaces should be formed into divided meshes as the triangles 5*a* of respectively different sizes.

The three points of the vertices of a triangle 5*a* share the same three-dimensional coordinates as those of the three points of the vertices of the other triangles 5*a*. As the triangle 5*a* becomes small, the whole triangle 5*a* becomes equal more closely to the original three-dimensional shape, and the whole surface of the triangle 5*a* becomes equal very close to the outer surface area of the whole shape. If the three-dimensional shapes and sizes are classified by categories of the kind from the computerized data of the three-dimensional surfaces that have been measured and collected by the three-dimensional scanner, the volume, length, circumference, and angle can be calculated.

As shown in FIG. 6, when three center points are first selected according to the one embodiment of the present invention, the center 30 of the entrance of the external auditory meatus 22, the center of the first bend 25 of the external auditory meatus 22, and the center of the second bend 26 of the external auditory meatus 22, are selected. Then, three circumferences that are formed around each of the three centers are determined.

The three circumferences may be denoted as the circumference $C_0$ of the sound entrance of the external auditory meatus 22, the circumference $C_1$ of the first bend of the external auditory meatus 22, and the circumference $C_2$ of the second bend of the external auditory meatus 22. A flat plane of an oval shape that is formed by each circumference should be perpendicular to the surface of the corresponding external auditory meatus 22.

$L_1$ denotes the distance from the center 30 of the entrance of the external auditory meatus 22 to the center of the first bend 25 of the external auditory meatus 22, $L_2$ denotes the distance from the center of the first bend 25 of the external auditory meatus 22 to the center of the second bend 26 of the external auditory meatus 22, $\theta_1$ is the angle between the $L_1$ and $L_2$, and $\theta_2$ is the angle between the $L_2$ and the circumferential plane of the second bend 26 of the external auditory meatus 22. As described above, the corresponding external auditory meatus 22 can be divided into eight different parameter variables such as volume, $C_0$, $C_1$, $C_2$, $L_1$, $L_2$, $\theta_1$, and $\theta_2$, by classification of the three-dimensional geometric shape and size.

The eight parameter variables such as volumes, circumferences ($C_0$, $C_1$, $C_2$), lengths ($L_1$, $L_2$), and angles ($\theta_1$, $\theta_2$) are obtained by the following sequence. As shown in FIGS. 4 through 6, an ear pattern 5 including an ear shell 3 and an ear cotton block 1 withdrawn from an ear canal of FIG. 1 is put into a three-dimensional scanner (model iscan) manufactured by Siemens company and then scanned geometrically in a stereo version with two cameras, to thereby first obtain mesh data of three-dimensional surface triangles 5*a* in the whole ear pattern 5 and then correcting three-dimensional shape models from the entrance area of the external auditory meatus 22 to the second bend 26 of the external auditory meatus 22, using a three-dimensional computer aided design (CAD) apparatus (rapidform), to thereby collect the mesh data of the entire three-dimensional surface triangular 5*a* on the surface of the ear shell 3, in which the upper and lower portions of the three-dimensional shape models are removed and the three-dimensional ear shell shapes are entirely corrected to have all closed surfaces.

Calculation of Volume

A tetrahedron is created with respect to the whole volume of the ear shell 3 from the mesh of the three-dimensional surface triangular 5*a* using the three-dimensional CAD (Tetgen), and then a sum of volumes of the respective tetrahedrons has been obtained by using the following expression.

$$\begin{vmatrix} 1 & x_i & y_i & z_i \\ 1 & x_j & y_j & z_j \\ 1 & x_m & y_m & z_m \\ 1 & x_p & y_p & z_p \end{vmatrix} \div 6$$

The result of this expression represents the volume of tetrahedral elements, in which xi, yi, zi to xp, yp, and zp represent rectangular coordinates of the four vertices of the tetrahedron.

Here, $$\begin{vmatrix} 1 & x_i & y_i & z_i \\ 1 & x_j & y_j & z_j \\ 1 & x_m & y_m & z_m \\ 1 & x_p & y_p & z_p \end{vmatrix}$$

is a determinant of $$\begin{bmatrix} 1 & x_i & y_i & z_i \\ 1 & x_j & y_j & z_j \\ 1 & x_m & y_m & z_m \\ 1 & x_p & y_p & z_p \end{bmatrix}.$$

Calculation of Circumference

The outer diameter of an oval of three places $C_0$, $C_1$, and $C_2$ is visually selected with the naked eye in the three-dimensional shape of the ear shell 3 with the three-dimensional CAD (rapidform), and then three points are randomly selected for the outer diameter of the oval on the surface of the three-dimensional shape of the ear shell 3, to thereby form a plane. A set of the points on the surface passing through this plane becomes a curve that is defined as the outer diameter. The set of the points on the surface passing through this plane is close to an elliptical shape.

The formula of obtaining the outer circumference is as follows.

$$C_0 \approx \pi\{5(a+b)/4 - ab/(a+b)\}$$

Here, $C_0$ is the outer diameter, a is the longest radius and b is the shortest radius.

$C_1$ and $C_2$ are also calculated in the same way.

Calculation of Center

Assuming two Cartesian coordinates on the circumference that constitutes the longest axis on the respective outer circumference of ovals of three places $C_0$, $C_1$, and $C_2$ are (xa, ya, za) and (xb, yb, zb), the center thereof becomes ((xa+xb)/2, (ya+yb)/2, (za+zb)/2).

The respective centers are calculated in the same way, with respect to $C_0$, $C_1$, and $C_2$.

Calculation of Distance

Assuming the center of $C_0$ is ($x_0$, $y_0$, $z_0$), the center of $C_1$ is ($x_1$, $y_1$, $z_1$), and the center of $C_2$ is ($x_2$, $y_2$, $z_2$), the distance between the center of $L_1$=$C_0$ and the center of $C_1$ $$= \sqrt{(x_1-x_0)^2+(y_1-y_0)^2+(z_1-z_0)^2}$$

the distance between the center of $L_2$=$C_1$ and the center of $C_2$ $$= \sqrt{(x_2-x_1)^2+(y_2-y_1)^2+(z_2-z_1)^2}$$

Calculation of Angle 1

$$\text{Vector } L_1 = (x_1-x_0)i+(y_1-y_0)j+(z_1-z_0)k$$

$$\text{Vector } L_2 = (x_2-x_1)i+(y_2-y_1)j+(z_2-z_1)k$$

$$\theta_1 = \cos^{-1}([(x1-x0)\times(x2-x1)+(y1-y0)\times(y2-y1)+(z1-z0)\times(z2-z1)] \div [\sqrt{(x1-x0)^2+(y1-y0)^2+(z1-z0)^2} \times \sqrt{(x2-x1)^2+(y2-y1)^2+(z2-z1)^2}])$$

Calculation of Angle 2

Assuming three points are taken from the circumference $C_2$ and the respective coordinates are ($x_4$, $y_4$, $z_4$), ($x_5$, $y_5$, $z_5$), and ($x_6$, $y_6$, $z_6$), the normal vector of the elliptical surface that is formed by the circumference $C_2$ is as follows.

$$\begin{aligned} \text{Normal vector } L_3 &= \begin{bmatrix} i & j & k \\ x5-x4 & y5-y4 & z5-z4 \\ x6-x4 & y6-y4 & z6-z4 \end{bmatrix} \\ &= [(y5-y4)(z6-z4)-(z5-z4)(y6-y4)]i + \\ &\quad [(x6-x4)(z5-z4)-(x5-x4)(z6-z4)]j + \\ &\quad [(x5-x4)(y6-y4)-(x6-x4)(y5-y4)]k. \end{aligned}$$

$$\text{Vector } L_2 = (x_2-x_1)i+(y_2-y_1)j+(z_2-z_1)k$$

From the vector $L_2$, and $L_3$ that have been previously calculated, the following equation is obtained.

$$\theta_2 = \cos^{-1}\left\{\begin{array}{c}\left[\begin{array}{l}(y5-y4)(z6-z4)-(z5-z4)(y6-y4)\times(x2-x1)+\\((x6-x4)(z5-z4)-(x5-x4)(z6-z4))\times(y2-y1)+\\((x5-x4)(y6-y4)-(x6-x4)(y5-y4))\times(z2-z1)\end{array}\right]+\\\left[\begin{array}{c}\sqrt{\begin{array}{l}((y5-y4)(z6-z4)-(z5-z4)(y6-y4))^2+\\(x6-x4)(z5-z4)-(x5-x4)(z6-z4))^2+\\((x5-x4)(y6-y4)-(x6-x4)(y5-y4))^2\end{array}}\times\\\sqrt{(x2-x1)^2+(y2-y1)^2+(z2-z1)^2}\end{array}\right]\end{array}\right\}$$

Table 1 shows the concrete numerical values of the models of the shapes of the average external auditory meatus 22 of the Korean men and women in which the concrete values of the shape models are created from the average geometric numerical values that are obtained by statistically processing data of the volumes, circumferences ($C_0$, $C_1$, $C_2$), lengths ($L_1$, $L_2$), and angles ($\theta_1$, $\theta_2$) of the external auditory meatuses 22 that are obtained by collecting and computerizing the ear patterns 5 of a number of the Koreans' sample external auditory meatuses 22.

TABLE 1

| | Men | Women |
|---|---|---|
| Volume | 874 mm³ | 736 mm³ |
| $C_0$ | 33.5 mm | 32.2 mm |
| $C_1$ | 29.6 mm | 28.4 mm |
| $C_2$ | 28.6 mm | 24.7 mm |
| $L_1$ | 4.3 mm | 3.4 mm |
| $L_2$ | 5.4 mm | 5.9 mm |
| $\theta_1$ | 142.4° | 140.5° |
| $\theta_2$ | 71.4° | 72.3° |

On the following, an effect of the average model shape and size of the ear shell 3 for the ITE type hearing aid that is manufactured according to the method of manufacturing the standard ear shell 3 for use in the ITE type general-purpose hearing aid considering the shape and size of the external auditory meatus 22 according to the embodiment of the present invention will be described.

Data of the Koreans' average model shapes and sizes for the ITE type or CIC type hearing aid or the ITE type receiver according to the method of manufacturing the standard ear shell 3 for use in the ITE type general-purpose hearing aid considering the shape and size of the external auditory meatus 22 according to the embodiment of the present invention, enables the average model ear shells 3 to be mass-produced according to the present invention, instead of making the individual ear shells 3 of the patients customized, to accordingly maintain a uniform quality of the hearing aid and remarkably reduce a manufacturing cost thereof.

In that case of the method of manufacturing the standard ear shell 3 for use in the ITE type general-purpose hearing aid considering the shape and size of the external auditory meatus 22 according to the embodiment of the present invention, the data of the Koreans' average model shapes and sizes is not appropriate for all the Koreans' external auditory meatuses 22, but is appropriate for most of the Korean's external auditory meatuses 22. That is, the data of the Koreans' average model shapes and sizes may not be appropriate for the Koreans of unusual body type.

However, the method of manufacturing the standard ear shell 3 for use in the ITE type general-purpose hearing aid considering the shape and size of the external auditory meatus 22 according to the embodiment of the present invention provides quantified average numerical values that are obtained by systematically classifying the shapes and sizes of the Koreans' external auditory meatuses 22, to thereby enable the quantified average numerical values to be used for a mass-production process of the ear shell 3 for use in the ITE type or CIC type hearing aid or the ITE type receiver, and to thus reduce the manufacturing cost of the ear shell 3 for use in the ITE type or CIC type hearing aid or the ITE type receiver.

Thus, the method of manufacturing the standard ear shell 3 for use in the ITE type general-purpose hearing aid considering the shape and size of the external auditory meatus 22 according to the embodiment of the present invention quantitatively measures shape and size of an external auditory meatus to calculate an average of the measured shape and size of the external auditory meatus, and minimizes an acoustic feedback of the hearing aid or a receiver to save a manufacturing cost, to thereby quickly provide the hearing aid for a patient, mass-produce an average model ear shell, and simultaneously maintain quality of the ear shell consistently.

Figure 7:
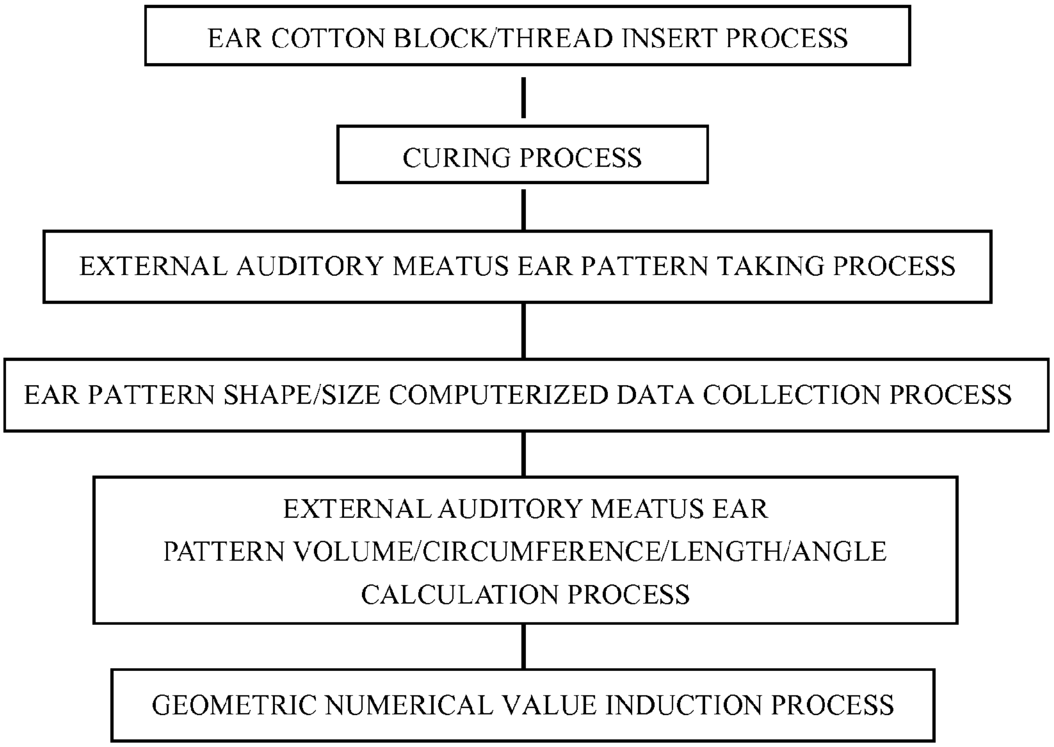
FIG. 7 is a flow-chart view for explaining a method of manufacturing a standard ear shell for use in an ITE type general-purpose hearing aid according to an embodiment of the present invention.

FIG. 7 is a flow-chart view for explaining a method of manufacturing a standard ear shell for use in an ITE type general-purpose hearing aid according to an embodiment of the present invention. As shown in FIG. 7, the standard ear shell manufacturing method includes: an ear cotton block/thread insert process; a curing process; an external auditory meatus ear pattern taking process; an ear pattern shape/size computerized data collection process; an external auditory meatus ear pattern volume/circumference/length/angle calculation process; and a geometric numerical value induction process.

As described above, the present invention has been described with respect to the ITE type hearing aid, but it is of course that the present invention may be applied for the CIC type hearing aid.

In the above description, the present invention has been described with respect to a particular embodiment that is applied for the Koreans, but the present invention is not limited thereto. It is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

EFFECTS OF THE INVENTION

According to the method of manufacturing the standard ear shell 3 for use in the ITE type general-purpose hearing aid considering the shape and size of the external auditory meatus 22 according to the embodiment of the present invention, the shape and size of an external auditory meatus is quantitatively measured to calculate an average of the measured shape and size of the external auditory meatus, and an acoustic feedback of the hearing aid or a receiver is minimized to save a manufacturing cost, to thereby quickly provide the hearing aid for a patient, mass-produce an average model ear shell, and simultaneously maintain quality of the ear shell consistently.

What is claimed is:

1. A method of manufacturing a standard ear shell for use in an ITE (In-The-Ear) type general-purpose hearing aid, the standard ear shell manufacturing method comprising:

an ear cotton block/thread insert process that pushes an ear cotton block into an external auditory meatus together with an elongate thread for use as a withdrawing purpose;

a curing process that injects a silicone resin mixture that is obtained by mixing silicone and a hardener at the ratio of 1 to 1, after having undergone the ear cotton block/thread insert process;

an external auditory meatus ear pattern taking process that pulls the elongate thread for use as a withdrawing purpose after having undergone the curing process, to thus take an external auditory meatus ear pattern including the ear cotton block and the ear shell that has been cured in the curing process;

an ear pattern shape/size computerized data collection process that computerizes and collects three-dimensional geometric shape and size of the external auditory meatus ear pattern from the external auditory meatus ear pattern that has been taken in the external auditory meatus ear pattern taking process, using a three-dimensional (3D) scanner;

an external auditory meatus ear pattern volume/circumference/length/angle calculation process that calculates volume, circumference length, and angle of the external auditory meatus from the three-dimensional geometric shape and size computerized data of the external auditory meatus ear pattern that has been collected in the ear pattern shape/size computerized data collection process; and a geometric numerical value induction process that statistically processes data of the volume, circumference length, and angle that have been collected from a number of the ear patterns of a number of the external auditory meatuses that have been calculated in the external auditory meatus ear pattern volume/circumference/length/angle calculation process, to thereby induce equated geometric numerical values.

* * * * *